Sept. 21, 1937.   F. T. FORSTER   2,093,669
VENT PLUG FOR STORAGE BATTERIES
Filed Nov. 15, 1935   2 Sheets-Sheet 1

INVENTOR
F. T. FORSTER
BY
ATTORNEY

Sept. 21, 1937.   F. T. FORSTER   2,093,669
VENT PLUG FOR STORAGE BATTERIES
Filed Nov. 15, 1935   2 Sheets-Sheet 2
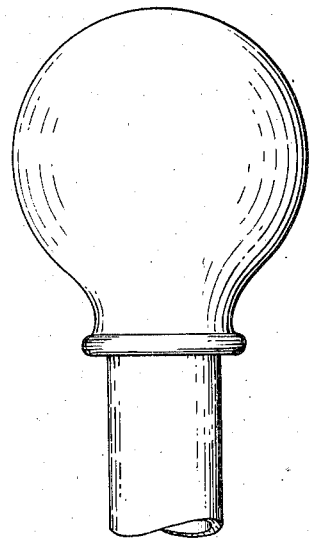
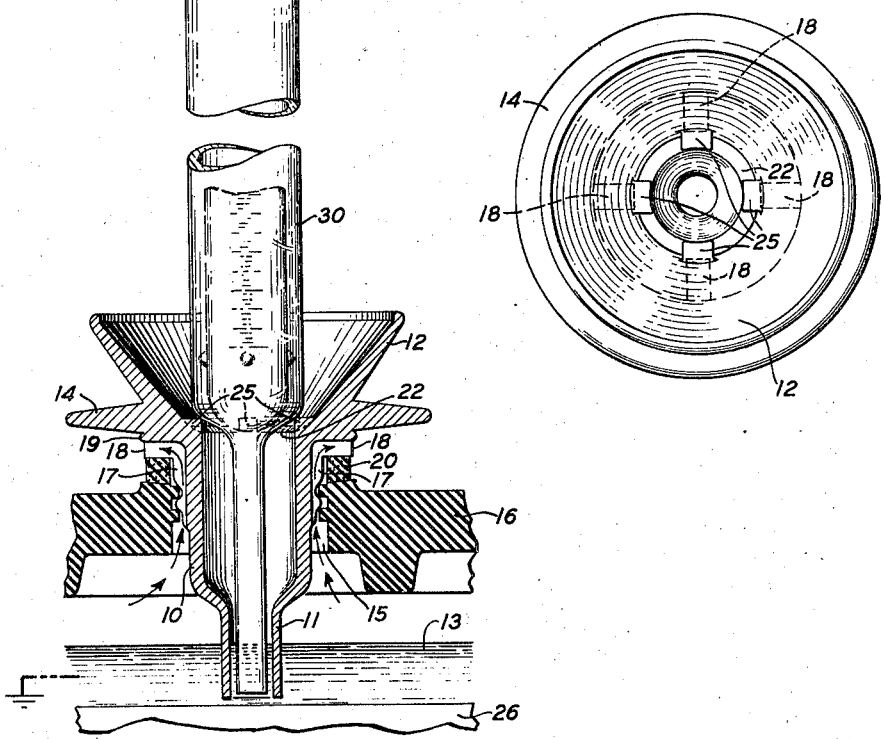
INVENTOR
F. T. FORSTER
BY
ATTORNEY Patented Sept. 21, 1937

2,093,669

UNITED STATES PATENT OFFICE 2,093,669

VENT PLUG FOR STORAGE BATTERIES

Frank T. Forster, New York, N. Y., assignor to Bell Telephone Laboratories, Incorporated, New York, N. Y., a corporation of New York Application November 15, 1935, Serial No. 49,874

1 Claim. (Cl. 136—177)

This invention relates in general to storage batteries and particularly to vent plugs which are mounted in the filler or vent openings in the covers of such batteries for permitting the free escape of gases which are generated within the batteries.

It is common practice today to provide enclosed storage batteries with filler openings through which water or electrolyte may be admitted to the battery and to furnish such openings with vent plugs which permit the free escape of gases generated within the battery into the air. In adding water or electrolyte to the battery such vent plugs are removed from the filler openings and the liquid added in any convenient manner through the filler opening.

It has been found that during maintenance and inspection of enclosed storage batteries, static charges carried on the person of the maintenance man or on an article, such as a hydrometer, carried by him, have caused explosion of the gases contained in the battery as well as of those gases escaping from the vent holes with serious consequences to both the maintenance man and battery.

It is the object of this invention to provide an improved type of vent plug for enclosed storage batteries which materially reduces the explosion hazard created by static sparks.

This object is attained in accordance with a feature of the invention by constructing the vent plug of metal and of such length as to insure the submersion of one end thereof in the electrolyte contained in the battery when the plug is in position in the filler opening in the battery cover. This feature provides a direct path to ground from the vent plug so that any electric charge which may be placed upon the plug is conducted to ground through the electrolyte without a spark, it being assumed that one of the battery terminals extending from the electrolyte is at ground potential, as is the usual practice.

Another feature of the invention resides in locating a guard near the vent outlets which precludes the possibility of a statically charged article being brought close to the vent holes which might result in the explosion of the gases emanating from the vents. This feature also minimizes the possibility of explosion due to arcing at the terminal parts.

A further feature of the invention resides in a combined funnel and vent plug which obviates the necessity for removing the vent plug from the filler opening when liquid is to be added to the battery.

A still further feature of the invention is embodied in a particular internal funnel construction or design which permits the addition of water or electrolyte to the battery without removing a test instrument such as a thermometer or hydrometer, which may be located in the vent plug.

These and other features of the invention will be readily understood from the following detailed description made with references to the accompanying drawings in which:

Fig. 3 is a sectional elevation of a slightly modified form of vent plug with a hydrometer shown in position in the plug, and Fig. 4 is a top plan view of the plug shown in Fig. 3.

Figure 2:
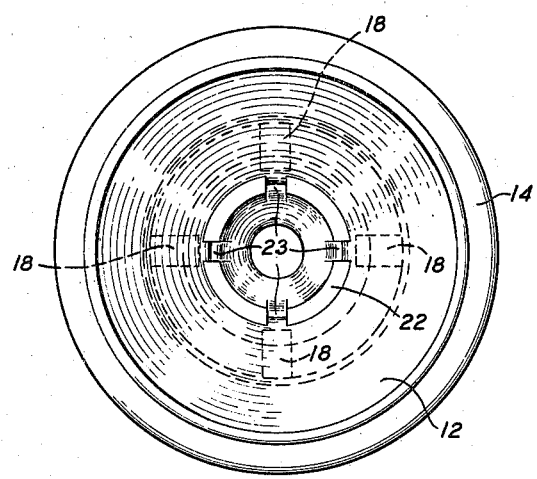
Fig. 2 is a top plan view of the vent plug shown in Fig. 1.
Figure 1:
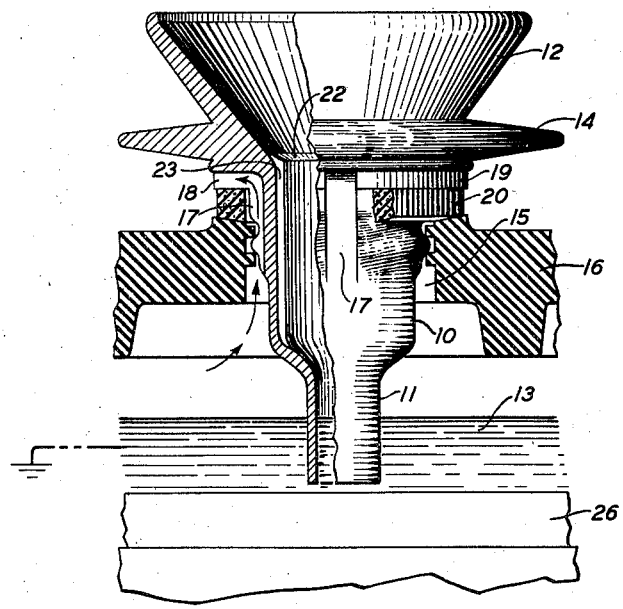
Fig. 1 is an elevation, partly in section, of the combined funnel and vent plug of this invention in position in the cover of a storage battery.

The vent plug of this invention as shown in Figs. 1 and 2, is made up as a single metallic element having a main body portion 10, a lower end portion 11 of smaller diameter than the main body portion 10 and an upper flared portion 12 all coacting to give the plug a general funnel-like appearance. The plug is hollow to provide a central passage and has an over-all longitudinal dimension such that insures the submersion of the lower end thereof in the electrolyte 13 even when the latter reaches its permissible low level. The end portion 11 is of smaller diameter than the body portion 10 of the plug in order to facilitate the cutting thereof to accommodate the plug to batteries of different sizes.

At the junction of the flared portion 12 of the vent plug with the main body portion 10 thereof, the plug metal is extended annularly to form a skirt or guard 14 which serves a purpose to be hereinafter described.

A portion of the outer periphery of the main body portion 10 of the plug is provided with a thread by virtue of which the plug may be screwed into the filler opening 15 formed in the battery cover 16, the wall of said opening being tapped to accommodate the threaded portion of the plug. The threads on the filler opening wall and on the portion 10 of the plug may be omitted, if desirable, and the plug forced into the filler opening without screwing.

At regularly spaced intervals, the threaded portion of the vent plug is cut away or grooved, as indicated by the numeral 17, to provide four longitudinal vent slots which cooperate with four similarly disposed slots 18 in the shoulder 19 of the vent plug to form four continuous L-shaped ducts. These ducts on the external surface of the plug appear merely as open trough-like slots when the plug is withdrawn from the filler opening but are closed when the plug is screwed into the battery cover, the longitudinal portions 17 being closed by the wall of the filler opening and the shoulder slots 18 being closed by the upper surface of the rubber washer 20, which is interposed between the shoulder 19 of the vent plug and the cover 16 of the battery. It is apparent therefore that when the plug is screwed or otherwise fitted into the battery cover, there are four diagonally disposed L-shaped ducts which provide adequate paths for the passage of gas generated within the battery, from the battery to the external atmosphere, one such path being indicated by the arrows in Fig. 1.

The circular guard or baffle 14 extends well out over the vent exits indicated at 18 so that it is practically impossible, or at least highly improbable, that any article which may bear an electric charge may come close enough to the gas vent to cause an explosion of gases emanating therefrom, without contacting the guard, under which circumstance the charge is carried to ground by way of the vent plug and the grounded electrolyte 13. The possibility of the escaping gases being accidentally exploded is accordingly materially reduced by the guard 14.

Any spark occurring on the inside of the funnel or in the well of the plug will not cause an explosion of the slight amount of gas coming up through the well due to the rapid diffusion afforded by the larger opening at the top of the plug. Nor can any inside spark be communicated to the gas under the battery cover as long as the bottom of the well is below the electrolyte level.

The inside of the plug is so designed as to provide a shoulder 22 which, in reality, constitutes the upper circular edge of the internal wall of the main body portion 10 of the plug. At regularly spaced intervals this wall is slotted in such a manner, either longitudinally as shown, spirally or in any other suitable manner, to provide ducts 23 by way of which water or electrolyte placed in the funnel end of the plug finds its way into the interior of the battery when a test instrument, such as a hydrometer, is located in the well. When such an instrument is located in the well it is supported in a vertical position by the shoulder 22 in a manner similar to that shown in Fig. 3.

Figs. 3 and 4 show an alternative design of the interior wall of the vent plug. The wall of the main body portion 10 is solid, that is, the longitudinal slots 23 of the plug shown in Figs. 1 and 2 have been omitted and four regularly spaced integral raised portions or projections 25 are located on the shoulder 22. As clearly illustrated in Fig. 3 a syringe hydrometer 30 when placed in the well rests upon the four projections so that there are four clearances between the syringe and the shoulder 22 which permit the passage of liquid into the battery by way of the funnel without removing the hydrometer from the well.

The numeral 26 in Figs. 1 and 3 indicates the battery plate separators which constitute an essential element of storage batteries.

The combined funnel and vent plug of this invention may be cast or molded as a single piece of lead alloy or any other suitable material. It is simple in design, inexpensive to manufacture and embodies many desirable features heretofore not found in devices of a similar nature.

What is claimed is:

In a storage battery having a cover provided with a screw-threaded filler opening and having an electrolyte therein with a gas space thereabove, a filling and vent plug comprising a metallic funnel provided with exterior, medially-disposed, screw-threads engaging the screw-threaded opening and provided with an imperforate hollow stem extending within said battery to a point below the level of the contained electrolyte to seal off the gas space above the electrolyte from the interior of the funnel, the screw-threads on the funnel being provided with vertically disposed grooves extending from the gas space to the exterior of the cover, and the funnel further provided with a horizontally extending guard skirt between the upper termination of the grooves and the top of the funnel.

FRANK T. FORSTER.